United States Patent Office 3,655,720
Patented Apr. 11, 1972

3,655,720
ISOPHORONE DERIVATIVES HAVING A NITRILE-CONTAINING SUBSTITUENT IN THE 4-POSITION
John Charles Leffingwell, Winston-Salem, N.C., assignor to R. J. Reynolds Tobacco Company, Winston-Salem, N.C.
No Drawing. Filed Feb. 3, 1969, Ser. No. 796,191
Int. Cl. C07c *121/48*
U.S. Cl. 260—464　　　　　　　　　　　　　　　1 Claim

ABSTRACT OF THE DISCLOSURE

Substituents are introduced into the 4-position of isophorone by reacting isopropenylacetate with isophorone to form isophorone enol acetate, then reacting with an isophorone enol acetate a dienophile to form bicyclic adducts which upon hydrolysis afford isophorone derivatives substituted in the 4-position.

This invention relates to a novel method for introducing substituents into the 4-position of isophorone.

Although the readily available ketone, isophorone, possesses the basic methyl ring substitution required for the preparation of such materials as ionone, carotenoid and vitamin A derivatives, no economical method is believed known for effecting substitution at the 4-position of isophorone.

It is therefore a principal object of this invention to provide a method for introducing substituents at the 4-position of isophorone.

In accordance with this invention isopropenylacetate is reacted with isophorone in the presence of an acid catalyst with the result that an equilibrium mixture of three isophorone enol acetate isomers is formed. Reaction of the isophorone enol acetate mixture with a dienophile results in the formation of bicyclic adducts which upon hydrolysis with a base provide isophorone derivatives substituted in the 4-position.

The synthesis can be illustrated using acrylonitrile as the dienophile by the following equation:

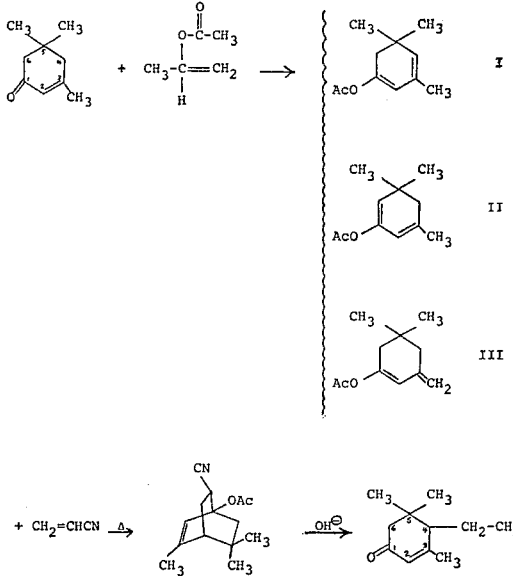

Reaction of isophorone with isopropenylacetate is carried out at a temperature from about 50 to 150° C., preferably 50 to 105° C., in the presence of an acid catalyst such as sulfuric acid, p-toluenesulfonic acid, hydrochloric acid, perchloric acid and the like. The isopropenylacetate is employed in an amount from about 1 to 2 moles in relation to the isophorone. Generally the reaction is completed in a period of about 1 to 4 hours.

This reaction results in the formation of an equilibrium mixture of three isophorone enol acetates designated above as I, II and III in about 95% yield. Isomer I, which is 3,5,5-trimethyl-1,3-cyclohexadien-1-ol acetate, comprises about 34% of the equilibrium mixture. Isomer II, which is 3,3,5-trimethyl-1,5-cyclohexadien-1-ol acetate, comprises about 22% of the equilibrium mixture. Isomer III, which is 3-methylidene-5,5-dimethyl-1-cyclohexen-1-ol acetate, comprises about 43% of the equilibrium mixture.

The three isomeric isophorone enol acetates can be readily separated by fractional distillation. However, in the pure form the isomers tend to polymerize whereas the isophorone enol acetate mixture is stable and can be stored. Accordingly, in a preferred embodiment of the invention the equilibrium mixture of isophorone enol acetates is employed for reaction with an unsymmetric dienophile, but, if desired, the isomeric isophorone enol acetates can be separated and Isomer I reacted with a dienophile.

A variety of unsymmetric dienophiles (compounds having an α,β-unsaturation) can be employed for reaction with the isophorone enol acetates depending primarily upon the substituent or functional groups desired to be introduced into the 4-position of isophorone. Thus, representative dienophiles are ethyl acrylate, acrylonitrile, maleic anhydride, methyl vinyl ketone, methyl acrylonitrile, methyl acrylate, methyl methacrylate, 3-pentene-2-one, ethyl vinyl ketone, acrolein, crotonaldehyde, methacrolein and the like. Reaction of the unsymmetrical dienophiles with the isophorone enol acetate or mixtures thereof results in the formation of bicyclic adducts and is carried out by heating the reactants together at a temperature of 80 to 200° C. for a period of about 3 to 64 hours.

The bicyclic adduct of isophorone enol acetate isomer I can then be caused to undergo a retroaldolization by treating with a base such as sodium hydroxide, potassium hydroxide, sodium ethoxide, sodium methoxide, potassium t-butylate and the like with the result that 4-substituted isophorone derivatives are obtained. This hydrolysis can be carried out at ambient temperatures, generally for a period from about ½ to 8 hours.

The following examples illustrate the present invention.

EXAMPLE I

Preparation of isophorone enol acetates

A mixture of isophorone (1594 g.) and isopropenylacetate (1594 g.) was heated with 1 gram of p-toluenesulfonic acid monohydrate. Acetone (about 700–800 ml.) was distilled off; when the temperature in the distillation head rose from 55° C. to about 90° C. the reaction was stopped and 10 grams anhydrous sodium acetate was added to the reaction mixture. The material was distilled in vacuo to give 287 grams recovered isopropenylacetate and 1968 grams (95%) of a mixture of the three isomeric enol acetates of isophorone, boiling point 98–101°/14–15 millimeters. Vapor phase chromatographic analysis indicated the following ratio of enol acetates over a 10 foot, 10% DEGS analytical column. Identification was by analysis of the nuclear magnetic resonance spectra of the isomeric acetates.

VAPOR PHASE CHROMATOGRAPHIC ANALYSIS OF ISOPHORONE ENOL ACETATE MIXTURE

| Compound | Structure | Percentage |
| --- | --- | --- |
| 3,5,5-trimethyl-1,3-cyclohexadien-1-ol acetate. | I | 34 |
| 3,3,5-trimethyl-1,5-cyclohexadien-1-ol acetate. | II | 22 |
| 3-methylidene-5,5-dimethyl-1-cyclohexen-1-ol acetate. | III | 43 |

EXAMPLE II

Reaction of isophorone enol acetates with methyl vinyl ketone

An equilibrium mixture of the isophorone enol acetates (540 g.) as obtained in Example I was reacted with methyl vinyl ketone (250 g.) in the presence of a small amount (~1 g.) of hydroquinone at reflux for 24 hours. The reaction temperature rose from 90° to 155° during this period. The crude reaction mixture when analyzed by vapor phase chromatography over a 10 foot, 5% SE-30 analytical column indicated that the 3,5,5-trimethyl-1,3-cyclohexadien-1-ol acetate (I) and 3,3,5-trimethyl-1,5-cyclohexadien-1-ol acetate (II) were greatly diminished and that the only major enol acetate of isophorone present was the 3-methylidene-5,5-dimethyl-1-cyclohexen-1-ol acetate (III) isomer. Two major product peaks were present in a ratio of 76:24; only a trace of other isomeric products was detected by vapor phase chromatography. Distillation over a cold-finger head gave 395 grams of recovered isophorone enol acetate and methyl vinyl ketone dimer, boiling point 60–120°/2 millimeters, and 330 grams of bicyclic adduct products, boiling point 120–135°/2 millimeters. The bicyclic adduct products were identified as 76% 3,3,5-trimethyl-7-acetyl-bicyclo[2.2.2]oct-5-en-1-ol acetate and 24% 4,6,6-trimethyl-7-acetyl-bicyclo[2.2.2]oct-2-en-2-ol acetate. Fractional distillation of a similar sample over a 3 foot spinning band column afforded the two individual isomers in high purity: 3,3,5-trimethyl-7-acetyl-bicyclo[2.2.2]oct-5-en-1-ol acetate, boiling point 132°/4 millimeters and 4,6,6-trimethyl-7-acetyl-bicyclo[2.2.2]oct-2-en-2-ol acetate, boiling point 130°/2.5 millimeters.

The bicyclic adducts were identified by their characteristic spectra. The infrared spectrum of 3,3,5-trimethyl-7-acetyl-bicyclo[2.2.2]oct-5-en-1-ol acetate exhibited absorptions at 3.39–3.48, 5.75, 5.85, 6.92, 7.32, 8.08, 8.33, 8.58, 8.72, 9.41 and 9.66 microns. The nuclear magnetic resonance spectrum (CDCl$_3$) showed singlet methyls at 9.1τ (3H) and 8.93τ (3H) corresponding to the methyls on the C-3 carbon; the allylic methyl on the C-5 carbon appeared at 8.15τ (3H, doublet, J≅1.7 c.p.s.) and the acetyl methyl and acetoxy methyls appeared at 8.01τ (3H, singlet) and 7.92τ (3H, singlet); the C-7 proton appeared as a pair of doublets centered at 6.66τ (1H) and the C-6 olefinic proton appeared at 4.2τ (1H). The mass spectrum exhibited molecular ion at m/e 250.

The infrared spectrum of 4,6,6-trimethyl-7-acetyl-bicyclo[2.2.2]oct-2-en-2-ol acetate exhibited absorptions at 3.40–3.48, 5.75, 5.84, 6.03, 7.31, 8.09, 8.58, 8.73, 9.40 and 9.66 microns and closely resembled the spectra of its isomer above. The nuclear magnetic resonance spectrum (CDCl$_3$) exhibited methyls on the C-6 carbon at 9.09τ (3H, singlet) and 8.94τ (3H, singlet); the methyl on the C-4 carbon appeared as a singlet at 8.89τ (3H); the acetyl and acetoxy methyls appeared as singlets at 7.95τ (3H) and 7.86τ (3H) while the olefinic proton appeared at 4.54τ (1H). The mass spectrum exhibited a molecular ion at m/e 250.

3,3,5 - trimethyl - 7 - acetyl-bicyclo[2.2.2]oct-5-en-1-ol acetate (5.0 g.) was added to a solution of sodium hydroxide (3 g.) in methanol (50 ml.) and agitated at room temperature for 4 hours. After pouring into water, ether extraction and solvent removal, 3.9 grams of a yellow oil which rapidly crystallized was obtained. Recrystallization gave 3.65 grams of 4,4a,5,6 - tetrahydro - 4,4,7-trimethyl - 2(3H) - naphthalenone, melting point 90–91°, whose infrared, nuclear magnetic resonance and mass spectra were identical to a known sample. This compound has the structure:

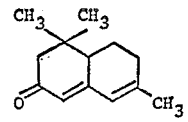

As disclosed in U.S. Pat. No. 3,217,717, this compound is useful as an additive for tobacco.

EXAMPLE III

An equilibrium mixture of the isophorone enol acetates (180 g.) as obtained in Example I was reacted with acrylonitrile (65. g.) in the presence of a small amount (1 g.) of hydroquinone at reflux for 120 hours. The reaction temperature rose from 80° to 120° during this period. Distillation over a cold finger head gave 53.9 grams recovered isophorone enol acetate, boiling point 76–92°/2 millimeters of mercury, and 125 grams of bicyclic adduct mixture, part of which slowly crystallized on standing.. The crystalline substance which comprised about 80% (by vapor phase chromatography analysis) of the bicyclic adducts was identified as 3,3,5-trimethyl-7-cyano-bicyclo[2.2.2]oct-5-en-1-ol acetate by its characteristic spectral properties. The nuclear magnetic resonance spectrum exhibited gem methyl groups at 9.08τ (3H) and 8.79τ (3H) as singlets; an allylic methyl group at 8.17τ (3H, doublet), the acetoxy methyl at 7.93τ (3H, singlet), the hydrogen at C-7 as a multiplet centered at 6.75τ (1H) and an olefinic proton at 4.13τ (1H, quartet). The bicyclic nitrile adduct mixture (25 g.) obtained by distillation as described above was added to a solution of sodium hydroxide (5 g.) in methanol (100 ml.) and agitated at room temperature for four hours. After pouring into water, methylene chloride extraction and solvent removal, 20.9 grams of product were obtained which analyzed on vapor phase chromatography as one major product (~80%) and one minor product (~20%). The major product which was identified as 2,6,6,-trimethyl-4-oxo-2-cyclohexene-1-propionitrile exhibited infrared absorptions at 6.0μ and 6.13μ indicative of the isophorone type, α,β-unsaturated carbonyl linkage and a —CN group at 4.45μ. This compound has the structure:

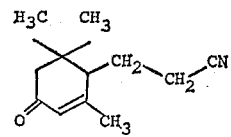

EXAMPLE IV

Reaction of isophorone enol acetates with methyl acrylonitrile

An equilibrium mixture of isophorone enol acetates as obtained in Example I is reacted with methyl acrylonitrile in a manner similar to that described in Example III to give bicyclic Diels-Alder adducts. The adduct mixture when agitated with alcoholic potassium hydroxide affords α,2,6,6-tetramethyl - 4 - oxo-2-cyclohexene-1-propionitrile. This compound has the following structure:

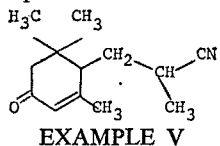

EXAMPLE V

Reaction of isophorone enol acetates with crotononitrile

An equilibrium mixture of isophorone enol acetates as obtained in Example I is reacted with crotononitrile in a manner similar to that described in Example III to give bicyclic Diels-Alder adducts. The adduct mixture when agitated with alcoholic potassium hydroxide affords β,2,6,6-tetramethyl-4-oxo-2-cyclohexene-1-propionitrile. This compound has the following structure:

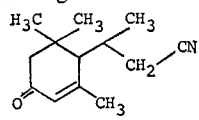

The present invention provides a convenient method for introducing substituents into the 4-position of isophorone to prepare various derivatives thereof. Thus, by the process of the invention, such compounds as 4,4a,5,6-tetrahydro-4,4,7-trimethyl-2(3H)-naphthalenone,
4,4a,5,6-tetrahydro-4,4-dimethyl2(3H)-naphthalenone,
4,4a,5,6-tetrahydro-4,4,5-trimethyl-2(3H)-naphthalenone,
4,4a,5,6-tetrahydro-4,4,6-trimethyl-2(3H)-naphthalenone,
4,4a,5,6-tetrahydro-4,4,5,6-tetramethyl-2(3H)-naphthalenone,
4,4a,5,6-tetrahydro-4,4,5,7-tetramethyl-2(3H)-naphthalenone,
2,6,6-trimethyl-4-oxo-2-cyclohexene-1-propionitrile,
α,2,6,6-tetramethyl-4-oxo-2-cyclohexene-1-propionitrile,
β,2,6,6-tetramethyl-4-oxo-2-cyclohexene-1-propionitrile,
α,β,2,6,6-pentamethyl-4-oxo-2-cyclohexene-1-propionitrile,
2,6,6-trimethyl-4-oxo-2-cyclohexene-1-acrylic acid methyl ester, 2,6,6 - trimethyl-4-oxo-2-cyclohexene-1-acrylic acid ethyl ester can be prepared from readily available and comparatively low cost isophorone.

Those modifications and equivalents which fall within the spirit of the invention are to be considered a part thereof.

I claim:

1. A process which comprises heating 3,5,5-trimethyl-1,3-cyclohexadien-1-ol acetate in the presence of an unsymmetrical ethylenic dienophile having the structure

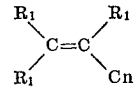

wherein $R_1$ is hydrogen or methyl at a temperature in the range of about 80–200° C. for a time sufficient to form a bicyclic adduct having the structure

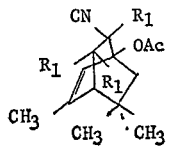

wherein $R_1$ is the same as above and subjecting said bicyclic adduct to retroaldolization by treating with a base to obtain the corresponding isophorone derivative having the formula

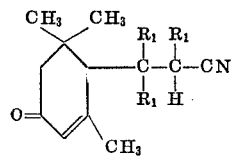

References Cited

UNITED STATES PATENTS 3,445,502   5/1969   Brown et al. ———— 260—464

JOSEPH PAUL BRUST, Primary Examiner

U.S. Cl. X.R.

260—346.6, 468, 488, 586

UNITED STATES PATENT OFFICE
CERTIFICATE OF CORRECTION

Patent No. 3,655,720             Dated April 11, 1972

Inventor(s) John Charles Leffingwell

It is certified that error appears in the above-identified patent and that said Letters Patent are hereby corrected as shown below:

Column 6, line 11, in the formula, "Cn" should be -- CN --

Signed and sealed this 19th day of September 1972.

(SEAL)
Attest:

EDWARD M. FLETCHER, JR.
Attesting Officer

ROBERT GOTTSCHALK
Commissioner of Patents